(12) United States Patent
Yanggratoke et al.

(10) Patent No.: US 12,520,234 B2
(45) Date of Patent: Jan. 6, 2026

(54) ESTIMATING POWER SAVED IN A NETWORK (71) Applicant: Telefonaktiebolaget LM Ericsson (publ), Stockholm (SE)

(72) Inventors: Rerngvit Yanggratoke, Järfälla (SE); Andreas Johnsson, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 416 days.

(21) Appl. No.: 18/042,350

(22) PCT Filed: Aug. 25, 2020

(86) PCT No.: PCT/IB2020/057932
§ 371 (c)(1),
(2) Date: Feb. 21, 2023

(87) PCT Pub. No.: WO2022/043733
PCT Pub. Date: Mar. 3, 2022

(65) Prior Publication Data
US 2023/0328642 A1 Oct. 12, 2023

(51) Int. Cl.
*H04W 52/02* (2009.01)
*G06N 20/00* (2019.01)
(52) U.S. Cl.
CPC ........ *H04W 52/0203* (2013.01); *G06N 20/00* (2019.01)
(58) Field of Classification Search
CPC . H04W 52/0203; H04W 24/02; H04W 24/08; G06N 20/00; Y02D 30/70
See application file for complete search history.

(56) References Cited

U.S. PATENT DOCUMENTS

| | | | | |
|---|---|---|---|---|
| 2008/0106146 | A1* | 5/2008 | Baek | H04L 12/2803 700/291 |
| 2010/0229016 | A1* | 9/2010 | Kodama | G06F 11/3062 709/224 |
| 2013/0077550 | A1* | 3/2013 | Ptasinski | H04W 52/0216 370/311 |

(Continued)

FOREIGN PATENT DOCUMENTS

CN 106686634 A 5/2017

OTHER PUBLICATIONS

International Search Report and Written Opinion dated May 31, 2021 issued in PCT Application No. PCT/IB2020/057932 filed Aug. 25, 2020, consisting of 12 pages.

(Continued)

*Primary Examiner* — Santiago Garcia
(74) *Attorney, Agent, or Firm* — Weisberg I.P. Law, P.A.

(57) ABSTRACT

There is provided a method for estimating power saved in a first network. The method is performed by a system. The method includes estimating the power saved in the first network as a difference between: a relationship between power consumption in the first network as a function of physical resource block usage in the first network when a power saving feature is deactivated in the first network, and at least one data point indicative of the power consumption in the first network for a physical resource block usage value when the power saving feature is activated in the first network.

28 Claims, 7 Drawing Sheets

Estimate the power saved in the first network as a difference between: a relationship between power consumption in the first network as a function of physical resource block usage in the first network when a power saving feature is deactivated in the network, and at least one data point indicative of the power consumption in the first network for a physical resource block usage value when the power saving feature is activated in the first network — 102

(56) References Cited

U.S. PATENT DOCUMENTS

| | | | | |
|---|---|---|---|---|
| 2015/0215933 | A1* | 7/2015 | Naslund | H04W 64/00 |
| | | | | 370/252 |
| 2019/0318365 | A1* | 10/2019 | Harms | G06Q 30/0239 |
| 2019/0349099 | A1 | 11/2019 | Scheck | |
| 2021/0271310 | A1* | 9/2021 | Janakiraman | G06F 1/3246 |
| 2025/0119838 | A1* | 4/2025 | Garner | H04W 52/0258 |

OTHER PUBLICATIONS

Xin Dang et al., Theil-Sen Estimators in a Multiple Linear Regrassion Model, University of Mississippi and Yale University, Olemiss Edu, 2008, consisting of 30 pages.
SCIKIT-LEARN Developers (BSD License), Linear Models, 2007-2019, consisting of 20 pages.

\* cited by examiner

ESTIMATING POWER SAVED IN A NETWORK

CROSS-REFERENCE TO RELATED APPLICATIONS

This application is a Submission Under 35 U.S.C. § 371 for U.S. National Stage Patent Application of International Application Number: PCT/IB2020/057932, filed Aug. 25, 2020 entitled "ESTIMATING POWER SAVED IN A NETWORK," the entirety of which is incorporated herein by reference.

TECHNICAL FIELD

The disclosure relates to a method for estimating power saved in a network and at least one entity configured to operate in accordance with that method.

BACKGROUND

In any network, such as any radio access network (RAN), power consumption form network nodes of the network can be a major operational expense (OpEX) for network operators. In order to reduce this OpEx, many power saving features have been released, e.g. at site level. Some examples of such a power saving feature include Micro Sleep Transmission (TX) and Multiple-Input Multiple-Output (MIMO) Sleep Mode, which are features that reduce power consumption during low-traffic periods.

Nevertheless, in order to invest in such a power saving feature, network operators often demand that network providers commit to a certain power saving for their in-service sites (prior to feature deployment). Generally, a power saving commitment is a commitment to saving a certain amount of power when a particular power saving feature is deployed (i.e. installed and turned on) in a network, e.g. for a particular site of the network. The amount of power saved is often measured in Kilowatts (kW). Also, network operators generally expect power saving gains without any negative impact on key performance indicators (KPIs) for the network.

It can be extremely challenging for network providers to meet commitments to power saving, since the amount of power saved in a network can depend on many factors. For example, these factors may include operator-specific factors, such as existing network configuration, assets, inter site distance (ISD), configured transmit powers, as well as traffic pattern. There currently exist two techniques aimed at addressing this issue, one that involves performing field trials and another that involves a manual analysis by subject matter experts (SMEs). The field trials generally involve the actual deployment of a power saving feature in the network and a testing period in which the power saving feature is turned on and off to determine the power that can be saved by deploying the power saving feature in the network. The manual analysis generally involves engineers, experienced in the deployment of a power saving feature in the field, inspecting the network to derive an estimate of the expected power that will be saved if the power saving feature is deployed in the network.

It is expected that power saving functionality will be developed and improved, and will be provided in different forms, in the future. Most likely, future power saving functionality will be implemented as cloud-native virtual network functions (VNFs). However, these VNFs will be associated with a footprint in terms of memory, hard disk (HD), and central processing unit (CPU) usage, as well as a potential reduction in network performance for some of the VNFs. Thus, not all VNFs can be installed at a network node (e.g. a base station, such as an evolved NodeB) at the same time. Furthermore, updates and improvements need to be managed.

There also exist problems with the two existing techniques mentioned earlier. Firstly, performing field trials requires a tight collaboration with the network operator to setup a controlled experimental environment. This process can be costly and can also result in a long turn-around time for the sale and deployment of the power saving features. Secondly, the manual analysis by SMEs relies on the availability of SMEs and also the accuracy of the manual analysis depends significantly on the experience of the SME that is tasked with the manual analysis.

SUMMARY

It is thus an object of the disclosure to obviate or eliminate at least some of the above-described disadvantages associated with existing techniques.

Therefore, according to an aspect of the disclosure, there is provided a method for estimating power saved in a first network. The method is performed by a system. The method comprises estimating the power saved in the first network as a difference between: a relationship between power consumption in the first network as a function of physical resource block usage in the first network when a power saving feature is deactivated in the first network, and at least one data point indicative of the power consumption in the first network for a physical resource block usage value when the power saving feature is activated in the first network.

In this way, an advantageous building block for estimating power saved in a network is provided. The technique is improved over existing techniques since it does not require any manual analysis and can thus be automated. This eliminates the turn-around time otherwise needed to set up a controlled environment, and also provides faster response times. Moreover, the fact that manual analysis is not required also supports enhanced availability and accessibility for power saving estimation. The technique also provides a more accurate estimation of power saved in a network. In this way, network providers can be more confident in their power saving gain commitments. A power saving feature can place a burden on a network as it is associated with a footprint in a network (e.g. in terms of memory and central processing unit usage) and can reduce the performance of communication channels in the network. As the technique provides a more accurate estimation of power saved in a network, this burden will not be placed on the network unnecessarily, since the network providers can be more confident that the amount of power saved in the network is worth this burden.

In some embodiments, the method may comprise applying a first machine learnt model, trained to identify relationships, to a first plurality of data points to identify the relationship. In some of these embodiments, each data point of the first plurality of data points may be indicative of the power consumption in the first network for a physical resource block usage value when the power saving feature is deactivated in the first network.

In some embodiments, the first machine learnt model may be trained to identify relationships using a regression algorithm.

In some embodiments, the method may comprise filtering, from a second plurality of data points, data points that are detected to be an anomaly. In some of these embodiments, each data point of the second plurality of data points may be indicative of the power consumption in the first network for a physical resource block usage value when the power saving feature is activated in the first network, and the at least one data point may be at least one data point that remains in the second plurality of data points following the filtering. In this way, the data points that remain are more reliable, which enables an even more accurate estimation of the power saved in the first network.

In some embodiments, the method may comprise detecting data points that are an anomaly.

In some embodiments, data points may be detected to be an anomaly using a second machine learnt model trained to detect anomalies.

In some embodiments, the second machine learnt model may be trained to detect anomalies using a local outlier factor (LOF) algorithm.

In some embodiments, the second machine learnt model may be trained to detect anomalies based on at least one measure of traffic in the first network and/or at least one key performance indicator (KPI) for the first network.

In some embodiments, a data point may be detected to be an anomaly if at least one measure of traffic in the first network at a time associated with the data point differs by more than a threshold amount from at least one corresponding measure of traffic in the first network at a time associated with at least one other data point in the second plurality of data points and/or at least one KPI for the first network at the time associated with the data point differs by more than a threshold amount from at least one corresponding KPI for the first network at the time associated with at least one other data point in the second plurality of data points.

In some embodiments, the filtering may be performed for each network node of the first network.

In some embodiments, the method may comprise separating acquired data into a first plurality of data points and a second plurality of data points. In these embodiments, each data point of the first plurality of data points may be indicative of the power consumption in the first network for a physical resource block usage value when the power saving feature is deactivated in the first network, and each data point of the second plurality of data points may be indicative of the power consumption in the first network for a physical resource block usage value when the power saving feature is activated in the first network.

In some embodiments, the separating may be performed for each network node of the first network.

In some embodiments, the at least one data point may be obtained from acquired data having a quality measure that is equal to or greater than a threshold value. In this way, the highest quality data can be used to enable the most accurate estimation of the power saved in the first network.

In some embodiments, the method may be performed for each data point indicative of the power consumption in the first network for a physical resource block usage value when the power saving feature is activated in the first network.

In some embodiments, the physical resource block usage may be a downlink physical resource block usage and/or an uplink physical resource block usage.

In some embodiments, the first network may comprise a plurality of network sites and the method may be performed in respect of each network site.

In some embodiments, the first network may be a radio access network (RAN).

In some embodiments, the first network may be a virtualized network. This can improve the scalability, portability, elasticity, and adaptability of the technique.

In some embodiments, the method may comprise training a third machine learnt model to predict a power saved in a second network when the power saving feature is activated. In these embodiments, an input to training of the third machine learning model may comprise one or more properties of the first network and an output of the third machine learnt model used for the training may comprise the estimated power saved.

In some embodiments, the method may comprise using the trained third machine learnt model to output a prediction of the power saved in the second network when the power saving feature is activated, by inputting into the trained third machine learnt model one or more properties of the second network.

In some embodiments, the method may comprise initiating activation of the power saving feature in the second network if the prediction is greater than a minimum threshold.

In some embodiments, the method may comprise determining whether the prediction is greater than the minimum threshold.

In some embodiments, the method may comprise initiating the activation of the power saving feature in the second network if a reduction in performance of the second network is less than a maximum threshold.

In some embodiments, the method may comprise determining whether the reduction in the performance of the second network is less than the maximum threshold.

In some embodiments, the second network may comprise a plurality of network sites and the method may be performed in respect of each network site.

In some embodiments, the second network may be a radio access network (RAN).

In some embodiments, the second network may be a virtualized network.

According to another aspect of the disclosure, there is provided a system for estimating power saved in a network. The system comprises at least one entity configured to operate in accordance with the method described earlier. The system thus provides the advantages described earlier.

In some embodiments, the at least one entity may comprise processing circuitry configured to operate in accordance with the method described earlier.

In some embodiments, the at least one entity may comprise at least one memory for storing instructions which, when executed by the processing circuitry, cause the entity to operate in accordance with the method described earlier.

According to another aspect of the disclosure, there is provided a computer program comprising instructions which, when executed by processing circuitry, cause the processing circuitry to perform the method described earlier. The computer program thus provides the advantages described earlier.

According to another aspect of the disclosure, there is provided a computer program product, embodied on a non-transitory machine-readable medium, comprising instructions which are executable by processing circuitry to cause the processing circuitry to perform the method described earlier. The computer program product thus provides the advantages described earlier.

Thus, an advantageous technique for estimating power saved in a network is provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

As mentioned earlier, an advantageous technique for estimating power saved in a network is described herein. The network is referred to herein as a first network.

The first network referred to herein can be a fifth generation (5G) network, or any other generation network. The first network referred to herein can be a radio access network (RAN), or any other type of network. The first network referred to herein can comprise one or more network nodes, such as one or more base stations. In a RAN embodiment, the first network referred to herein may comprises one or more evolved Node Bs (eNodeBs) and/or any other RAN nodes. In some of these embodiments, the method described herein in respect of the first network may be performed in respect of each network node of the first network. In some embodiments, the first network referred to herein can be a virtualized network (e.g. comprising at least some virtual network nodes), or an at least partially virtualized network (e.g. comprising at least some virtual network nodes and at least some hardware network nodes). In some embodiments, the first network referred to herein may comprise a plurality of network sites. In some of these embodiments, the method described herein in respect of the first network may be performed in respect of each network site of the first network.

A system can perform the method described herein or, more specifically, at least one entity of the system can be configured to operate in accordance with the method described herein. In some embodiments, a single entity of the system may be configured to perform all steps of the method described herein. In other embodiments, one or more entities of the system can be configured to perform one or more of the steps of the method described herein.

Figure 1:
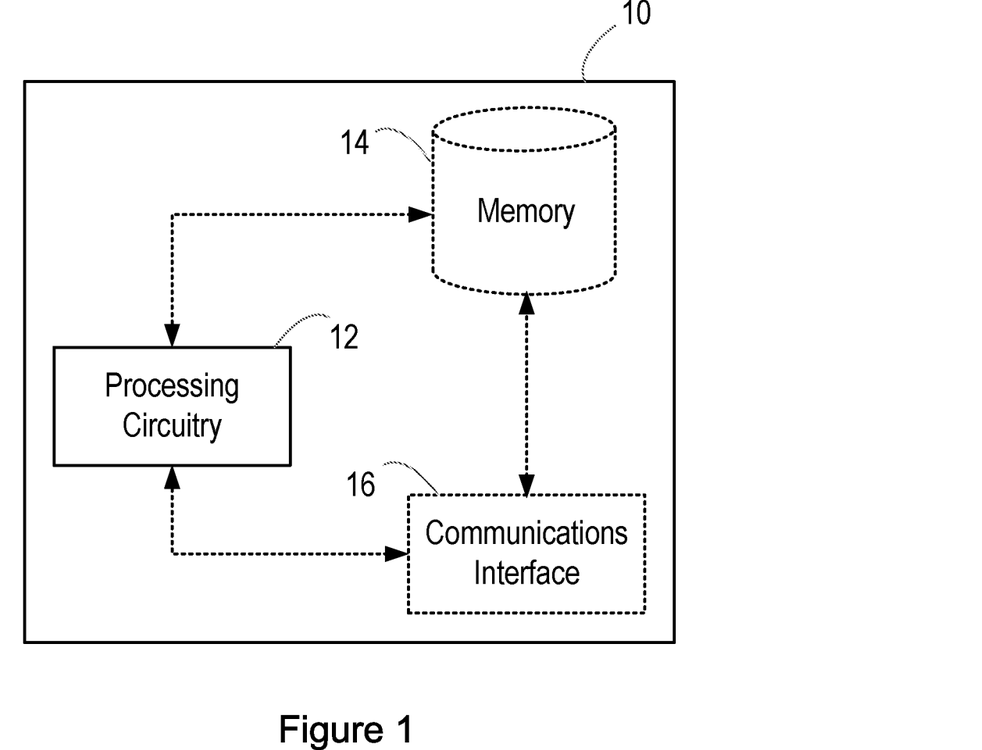
FIG. 1 is a block diagram illustrating an entity according to an embodiment.

FIG. 1 illustrates such an entity 10 in accordance with an embodiment. The entity 10 is for estimating power saved in a first network. The entity 10 may, for example, be a physical machine (e.g. a server) or a virtual machine (VM).

As illustrated in FIG. 1, the entity 10 comprises processing circuitry (or logic) 12. The processing circuitry 12 controls the operation of the entity 10 and can implement the method described herein in respect of the entity 10. The processing circuitry 12 can be configured or programmed to control the entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the entity 10. In some embodiments, the processing circuitry 12 can be configured to run software to perform the method described herein in respect of the entity 10. The software may be containerised according to some embodiments. Thus, in some embodiments, the processing circuitry 12 may be configured to run a container to perform the method described herein in respect of the entity 10.

Briefly, the processing circuitry 12 of the entity 10 is configured to estimate the power saved in the first network as a difference between: (i) a relationship between power consumption in the first network as a function of physical resource block usage in the first network when a power saving feature is deactivated in the first network, and (ii) at least one data point indicative of the power consumption in the first network for a physical resource block usage value when the power saving feature is activated in the first network.

As illustrated in FIG. 1, in some embodiments, the entity 10 may optionally comprise a memory 14. The memory 14 of the entity 10 can comprise a volatile memory or a non-volatile memory. In some embodiments, the memory 14 of the entity 10 may comprise a non-transitory media. Examples of the memory 14 of the entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the entity 10 can be connected to the memory 14 of the entity 10. In some embodiments, the memory 14 of the entity 10 may be for storing program code or instructions which, when executed by the processing circuitry 12 of the entity 10, cause the entity 10 to operate in the manner described herein in respect of the entity 10. For example, in some embodiments, the memory 14 of the entity 10 may be configured to store program code or instructions that can be executed by the processing circuitry 12 of the entity 10 to cause the entity 10 to operate in accordance with the method described herein in respect of the entity 10. Alternatively or in addition, the memory 14 of the entity 10 can be configured to store any information, data, messages, requests, responses, indications, notifications, signals, or similar, that are described herein. The processing circuitry 12 of the entity 10 may be configured to control the memory 14 of the entity 10 to store information, data, messages, requests, responses, indications, notifications, signals, or similar, that are described herein.

In some embodiments, as illustrated in FIG. 1, the entity 10 may optionally comprise a communications interface 16. The communications interface 16 of the entity 10 can be connected to the processing circuitry 12 of the entity 10 and/or the memory 14 of entity 10. The communications interface 16 of the entity 10 may be operable to allow the processing circuitry 12 of the entity 10 to communicate with the memory 14 of the entity 10 and/or vice versa. Similarly, the communications interface 16 of the entity 10 may be operable to allow the processing circuitry 12 of the entity 10 to communicate with any other entities and/or any nodes described herein. The communications interface 16 of the entity 10 can be configured to transmit and/or receive information, data, messages, requests, responses, indications, notifications, signals, or similar, that are described herein. In some embodiments, the processing circuitry 12 of the entity 10 may be configured to control the communications interface 16 of the entity 10 to transmit and/or receive information, data, messages, requests, responses, indications, notifications, signals, or similar, that are described herein.

Although the entity 10 is illustrated in FIG. 1 as comprising a single memory 14, it will be appreciated that the entity 10 may comprise at least one memory (i.e. a single memory or a plurality of memories) 14 that operate in the manner described herein. Similarly, although the entity 10 is illustrated in FIG. 1 as comprising a single communications interface 16, it will be appreciated that the entity 10 may comprise at least one communications interface (i.e. a single communications interface or a plurality of communications interface) 16 that operate in the manner described herein. It will also be appreciated that FIG. 1 only shows the components required to illustrate an embodiment of the entity 10 and, in practical implementations, the entity 10 may comprise additional or alternative components to those shown.

Figure 2:
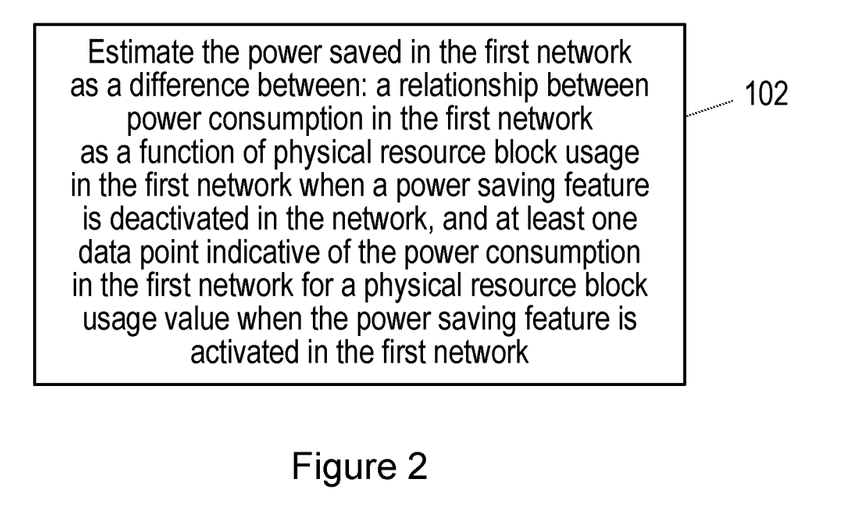
FIG. 2 is a flowchart illustrating a method performed by an entity according to an embodiment.

FIG. 2 is a flowchart illustrating a method performed by a system (e.g. at least one entity 10 of the system) in accordance with an embodiment. The method is for estimating power saved in a first network. Herein, the power saved in the first network may also be referred to as a gain in power consumption, or a power consumption gain. The entity 10 described earlier with reference to FIG. 1 can be configured to operate in accordance with the method of FIG. 2. The method can be performed by or under the control of the processing circuitry 12 of the entity 10 according to some embodiments.

With reference to FIG. 2, as illustrated at block 102, the power saved in the first network is estimated as a difference between: (i) a relationship between power consumption in the first network as a function of physical resource block usage in the first network when a power saving feature is deactivated in the first network, and (ii) at least one data point indicative of the power consumption in the first network for a physical resource block usage value when the power saving feature is activated in the first network. In some embodiments, the relationship between power consumption in the first network as a function of physical resource block usage the first network may be a linear relationship. However, it will be understood that other (e.g. non-linear) relationships may occur between power consumption in the first network as a function of physical resource block usage the first network according to other embodiments.

The physical resource block (PRB) usage of a network can be the number of PRBs, or the percentage of PRBs, in use in that network. A PRB may be in use in a network where it has been allocated, e.g. to a user equipment (UE). Herein, a PRB can be defined as the smallest unit of resource that can be used. For example, in new radio (NR), a PRB may comprise a predefined number of (e.g. twelve) carriers (or subcarriers) in the frequency domain and, in long term evolution (LTE), a PRB may comprise a predefined number of (e.g. twelve) carriers (or subcarriers) in the frequency domain and one slot in the time domain.

Herein, the term "activated" can mean that the power saving feature is turned on, whereas the term "deactivated" can mean that the power saving feature is turned off. The power saving feature referred to herein can be any feature that is intended to save power in a network, e.g. any feature that can reduce power consumption in a network. The power saving feature can also be referred to as a power saving functionality.

Examples of power saving features include, but are not limited to, the Micro Sleep Transmission (TX) feature, the Multiple-Input Multiple-Output (MIMO) Sleep Mode feature, or any other feature that can reduce power consumption in a network. In some embodiments, the first network referred to herein may be any network in which the power saving feature is already deployed.

Figure 3:
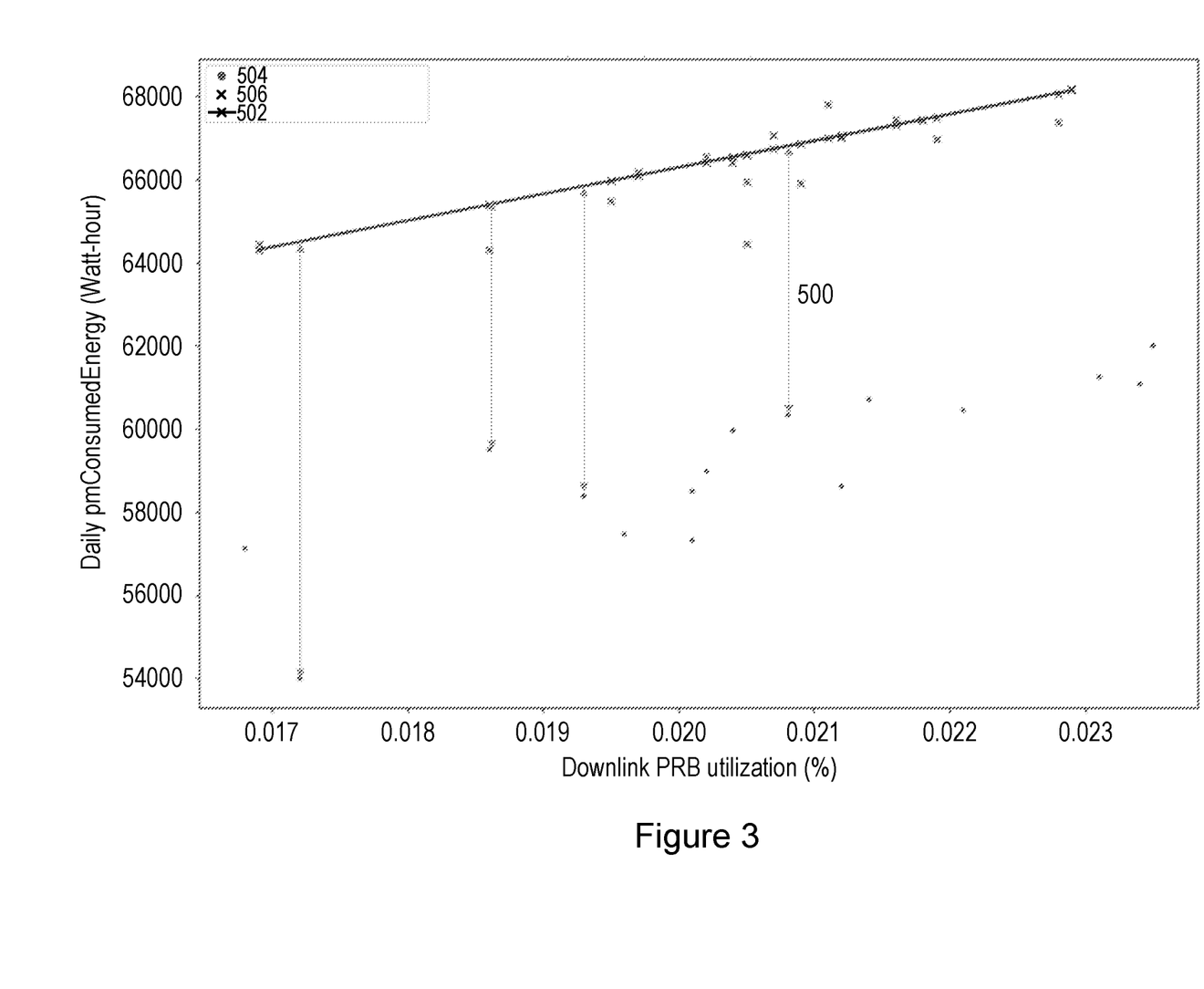
FIG. 3 is a graphical illustration of a method performed by a system according to an embodiment.

FIG. 3 is a graphical illustration of the method according to an embodiment. In more detail, FIG. 3 illustrates power consumption in the first network as a function of physical resource block usage in the first network. In the embodiment illustrated in FIG. 3, power consumption in the first network is the vertical axis and physical resource block usage in the first network is the horizontal axis.

In the embodiment illustrated in FIG. 3, there is a first plurality of data points 506 and a second plurality of data points 504. Each data point of the first plurality of data points 506 is indicative of the power consumption in the first network for a physical resource block usage value when the power saving feature is deactivated in the first network. Each data point of the second plurality of data points 504 is indicative of the power consumption in the first network for a physical resource block usage value when the power saving feature is activated in the first network.

In the embodiment illustrated in FIG. 3, the power consumption in the first network is the daily performance management (pm) consumed energy (measured in Watt-hours). However, it will be understood that this is only one example measure of power consumption and other measures of power consumption may be used instead or as well. In the embodiment illustrated in FIG. 3, the physical resource block usage in the first network is the downlink physical resource block (PRB) usage (measured as a percentage). However, it will be understood that this is only one example measure of physical resource block usage and other measures of physical resource block usage (e.g. uplink PRB usage) may be used instead or as well.

FIG. 3 also illustrates the relationship 502 between the power consumption in the first network as a function of the physical resource block usage in the first network when a power saving feature is deactivated in the first network. In other words, FIG. 3 illustrates the relationship 502 between the power consumption in the first network and the physical resource block usage in the first network when a power saving feature is deactivated in the first network. In the embodiment illustrated in FIG. 3, this relationship 502 is a linear relationship. However, it will be understood that other (e.g. non-linear) relationships are also possible according to other embodiments.

The method described herein for estimating the power saved in the first network may comprise a plurality of consecutive phases according to some embodiments. The plurality of consecutive phases can, for example, comprise (i) data acquisition (as will be described later with reference to FIG. 4), (ii) data pre-processing and model training (as will be described later with reference to FIG. 5), and (iii) application of the trained model (as will be described later with reference to FIG. 6). However, it will be understood that not all of these phases may be performed and that at least some of the phases (and at least some of the steps in those phases) can be optional.

Figure 4:
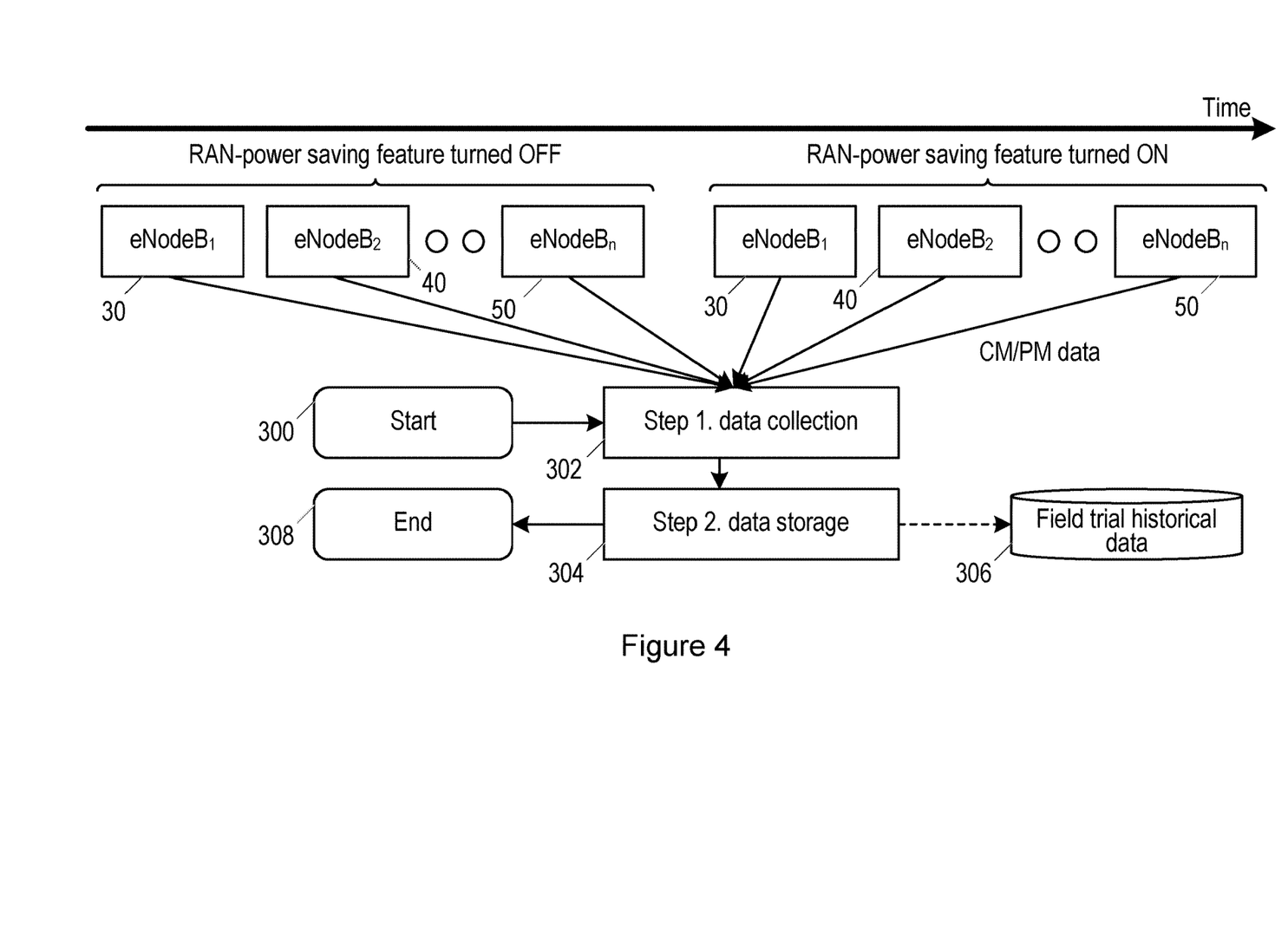
FIG. 4 is a flowchart illustrating a method performed by a system according to an embodiment.

FIG. 4 is a flowchart illustrating a method performed by a system (e.g. at least one entity 10 of the system) in accordance with an embodiment. The entity 10 described earlier with reference to FIG. 1 can be configured to operate in accordance with the method of FIG. 4. The method can be performed by or under the control of the processing circuitry 12 of the entity 10 according to some embodiments. FIG. 4 relates to a method for data acquisition. The method starts at block 300 of FIG. 4.

As illustrated at block 302 of FIG. 4, in some embodiments, data can be acquired (or collected) from the first network. For example, as illustrated in FIG. 4, data can be acquired (or collected) from one or more network nodes 30, 40, 50 of the first network according to some embodiments. The one or more network nodes 30, 40, 50 can be a selected network node (or a selected set of network nodes) of the first network or all network nodes of the first network. In a RAN embodiment, the one or more network nodes 30, 40, 50 can comprise one or more RAN network nodes, such as one or more eNodeBs. The data is acquired over time. More specifically, as illustrated in FIG. 4, the data is acquired over a first time period during which a power saving feature is deactivated in the first network and a second time period during which the power saving feature is activated in the first network. The power saving feature can be a specific power saving feature, e.g. Micro Sleep TX, MIMO Sleep Mode, or any other power saving feature. In some embodiments, the data referred to herein can be configuration management (CM) data, performance management (PM) data, or any other type of management data for the first network.

As illustrated at block 304 of FIG. 4, in some embodiments, the acquired data may be stored. More specifically, at least one memory 306 may be controlled to store the acquired data. The at least one memory 306 can, for example, comprise a memory 14 of the entity 10 and/or any other memory (e.g. a centralized memory). The data referred to herein may thus be referred to as historical data according to some embodiments. In some embodiments, the data referred to herein may be acquired during field trials (or experiments). Thus, the data referred to herein may also be referred to as field trial data, or historical field trial data, according to some embodiments. The field trials can involve turning on and off the power saving feature. Thus, FIG. 4 provides a method for acquiring and optionally also storing data. The method ends at block 308 of FIG. 4.

Figure 5:
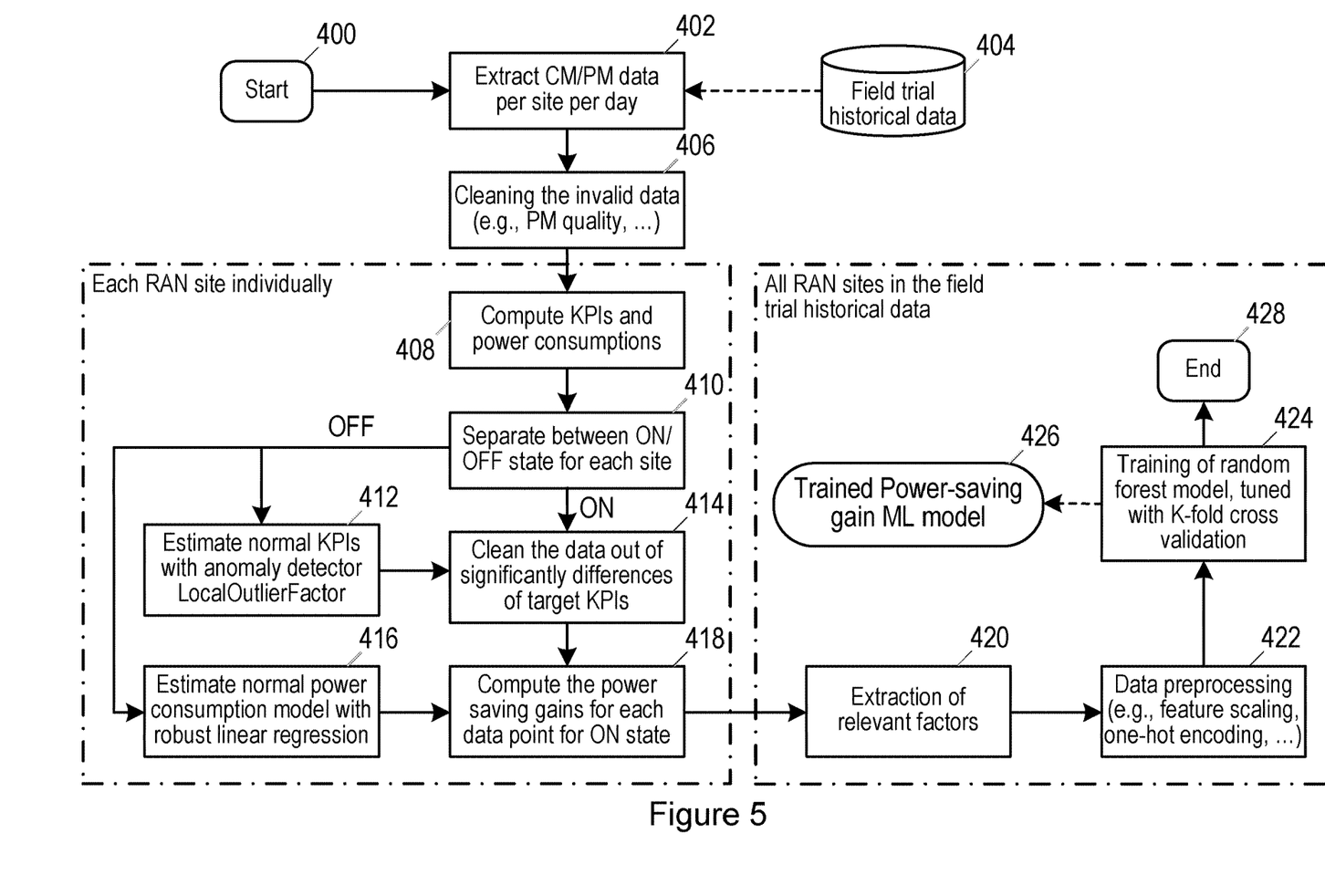
FIG. 5 is a flowchart illustrating a method performed by a system according to an embodiment.

FIG. 5 is a flowchart illustrating another method performed by a system (e.g. at least one entity 10 of the system) in accordance with an embodiment. The entity 10 described earlier with reference to FIG. 1 can be configured to operate in accordance with the method of FIG. 5. The method can be performed by or under the control of the processing circuitry 12 of the entity 10 according to some embodiments. FIG. 5 relates to a method for data pre-processing and model training. The method starts at block 400 of FIG. 5.

As illustrated at block 402 of FIG. 5, in some embodiments, data can be acquired for the first network. For example, data can be acquired for one or more network nodes 30, 40, 50 and/or one or more sites of the first network. In some embodiments, the data can be acquired from the first network itself or from at least one memory 306, 404, such as a memory 14 of the entity 10 and/or any other memory (e.g. a centralized memory). For example, at least some of the data may have been previously stored in at least one memory 306, 404 in the manner described earlier with reference to FIG. 3. In some embodiments, the data may be acquired during field trials. In some embodiments, an agent can be executed to perform data collection at block 402 of FIG. 5, e.g. for each network node and/or for each site, such as during a field trial. As mentioned earlier, in some embodiments, the data referred to herein can be configuration management (CM) data, performance management (PM) data, or any other type of management data for the first network. Following the acquisition of data, a pre-processing and model development phase may follow. For example, relevant data may be extracted from the acquired data, such as by filtering and/or aggregating the acquired data (e.g. per site and/or per day).

As illustrated at block 406 of FIG. 5, in some embodiments, the acquired data can be cleaned. The cleaning of acquired data can remove any invalid data. The acquired data may be cleaned in any suitable way and a person skilled in the art will be aware of various techniques that may be used in this regard. However, in an example, the acquired data may be cleaned by computing a data quality metric (or measure) for the acquired data and only keeping acquired data that has a quality metric (or measure) that is equal to or greater than a threshold value. An example of computing a quality metric for the acquired data is given by the following equation:

$$\text{Quality metric} = \text{rop\_count}/(4*24*7*\text{cell\_count}),$$

where rop_count denotes the number of reporting output periods (ROPs) for the acquired data and cell_count denotes the number of cells associated with each row of the acquired data. If the threshold value is set to 0.90 (or 90%), then only acquired data having a quality metric of at least 0.90 (or at least 90%) of the ROPs is kept. By cleaning the acquired data, it can be ensured that the acquired data is reliable.

Returning back to FIG. 5, steps 408-418 can be performed for each network site or node of the first network (e.g. individually or separately) according to some embodiments. As illustrated at block 408 of FIG. 5, in some embodiments, the power consumption and optionally also at least one key performance indicator (KPI) for the first network may be computed for the first network from the acquired data. In some embodiments, this computation may be performed for each network node 30, 40, 50 of the first network and/or for a predefined time period (e.g. per day). Examples of the types of power consumption that may be computed include, but are not limited to, PM consumed energy (e.g. of a meter operator class energy meter), CM consumed energy, and/or any other power consumption. Examples of the types of KPIs that may be computed include, but are not limited to, accessibility (e.g. expressed as a percentage), downlink and/or uplink latency (e.g. expressed in ms), downlink and/or uplink packet loss rate (e.g. expressed as a percentage), retainability (e.g. expressed as a percentage), mobility success rate (e.g. expressed as a percentage), and/or any other KPIs. In some embodiments, an aggregate power consumption may be computed, e.g. across all cells and/or sectors in one or more network nodes 30, 40, 50 of the first network.

As illustrated at block 410 of FIG. 5, in some embodiments, the acquired data may be separated into the first plurality of data points 506 and the second plurality of data points 504. The separating at block 410 of FIG. 5 can be performed for each network node 30, 40, 50 of the first network and/or for each network site of the first network according to some embodiments. As mentioned earlier, each data point of the first plurality of data points 506 is indicative of the power consumption in the first network for a physical resource block usage value when the power saving feature is deactivated in the first network. As also mentioned earlier, each data point of the second plurality of data points 504 is indicative of the power consumption in the first network for a physical resource block usage value when the power saving feature is activated in the first network. Thus, at block 410 of FIG. 5, the acquired data can be separated into two mutually exclusive parts, which comprise (i) data for time periods (e.g. days) when the power saving feature is deactivated in the first network, and (ii) data for time periods (e.g. days) when the power saving feature is activated in the first network.

In FIG. 5, the steps illustrated at blocks 412 and 416 are performed in relation to the first plurality of data points 506 (i.e. where the power saving feature is deactivated in the first network) and the step illustrated at block 414 is performed in relation to the second plurality of data points 504 (i.e. where the power saving feature is activated in the first network). As illustrated at block 412 of FIG. 5, in some embodiments, data points that are an anomaly in the first plurality of data points 506 may be detected. This anomaly detection may be performed for each network node 30, 40, 50 of the first network according to some embodiments. In some embodiments, data points may be detected to be an anomaly in the first plurality of data points 506 using a machine learnt model, which is trained to detect anomalies. This machine learnt model will be referred to herein as the second machine learnt model. For example, the data point anomaly detection may comprise fitting the second machine learnt model to the first plurality of data points 506 to detect data points in the first plurality of data points 506 that are an anomaly. The second machine learnt model may, for example, be trained to detect anomalies using a local outlier factor (LOF) algorithm or any other suitable algorithm.

In some embodiments, the second machine learnt model can be trained to detect anomalies based on at least one measure of traffic in the first network (i.e. traffic information for the first network) and/or at least one key performance indicator (KPI) for the first network. Thus, in some embodiments, an input to the second machine learnt model may comprise traffic related at least one measure of traffic in the first network and/or at least one KPI for the first network. In some of these embodiments, a data point may be detected to be an anomaly if at least one measure of traffic in the first network at a time associated with the data point differs by more than a threshold amount from at least one corresponding measure of traffic in the first network at a time associated with at least one other data point in the second plurality of data points, and/or at least one KPI for the first network at the time associated with the data point differs by more than a threshold amount from at least one corresponding KPI for the first network at the time associated with at least one other data point in the second plurality of data points.

Examples of the at least one measure of traffic in the first network used for the data point anomaly detection include, but are not limited to, an average number of users connected in the first network (e.g. a number of radio resource control (RRC) connected users in the first network), an average number of downlink active users in the first network, an average number of uplink active users in the first network, and/or any other measures of traffic in the first network. Examples of the types of KPIs for the first network used for the data point anomaly detection include, but are not limited to, accessibility (e.g. expressed as a percentage), downlink and/or uplink latency (e.g. expressed in ms), downlink and/or uplink packet loss rate (e.g. expressed as a percentage), retainability (e.g. expressed as a percentage), mobility success rate (e.g. expressed as a percentage), and/or any other KPIs. In some embodiments, the data point anomaly detection may involve setting a number of neighbours K. For example, the number of neighbours K may be set to floor (N/2), where N is an average number of days that the power saving feature is turned on (e.g. across all sites) in the first network.

As illustrated at block 414 of FIG. 5, according to some embodiments, data points that are detected to be an anomaly may be filtered from the second plurality of data points 504 (i.e. where the power saving feature is activated in the first network). In some embodiments, this filtering at block 414 of FIG. 5 may be performed for each network node 30, 40, 50 of the first network. In some embodiments, this filtering can be based on the trained second machine learnt model described earlier with reference to block 412 of FIG. 5. That is, in some embodiments, the trained second machine learnt model may be applied to the second plurality of data points 504 to filter out data points that are detected to be an anomaly. For example, this trained second machine learnt model can be assumed to be indicative of a normal operation of the first network. In this way, it is possible to filter out data points that will be used later to estimate the power saved in the first network. The aim of the filtering at block 414 of FIG. 5 can be to clean the second plurality of data points 504 of data points in respect of which at least one measure of traffic in the first network and/or at least one KPI for the first network is more than a predefined amount (e.g. significantly) different to at least one corresponding measure of traffic in the first network and/or at least one corresponding KPI in respect of other data points of the second plurality of data points 504, such that these data points are not included in the later estimation of the power saved in the first network.

As illustrated at block 416 of FIG. 5, according to some embodiments, a machine learnt model, trained to identify relationships, may be applied to the first plurality of data points 506 to identify the relationship 502 between power consumption in the first network as a function of physical resource block usage in the first network when the power saving feature is deactivated in the first network. This machine learnt model will be referred to herein as the first machine learnt model. In some embodiments, the first machine learnt model may be trained to identify relationships using a regression algorithm, such as a linear regression algorithm, a random forest regression algorithm, or any other regression algorithm. In cases where the power consumption in the first network is known (e.g. from domain knowledge) to have a linear relationship with the physical resource block usage in the first network, a linear regression algorithm may be used. A robust regression algorithm may be used, since sometimes the first plurality of data points 506 may comprise outliers from extreme cases, which it is advantageous not to capture. An example of a regression algorithm that may be used is the Theil-Sen estimator algorithm. This algorithm can be advantageous due to the limited dimension of input data and the tolerance to corrupted data.

The relationship 502 that is identified at block 416 of FIG. 5 is used to estimate the target variable, which in this case is the power saved in the first network. In particular, as illustrated at block 418 of FIG. 5, as described earlier, the power saved in the first network is estimated as a difference 500 between (i) a relationship 502 between power consumption in the first network as a function of physical resource block usage in the first network when a power saving feature is deactivated in the first network, and (ii) at least one data point 504 indicative of power consumption in the first network for a physical resource block usage value when the power saving feature is activated in the first network.

In some embodiments, the physical resource block usage can be a downlink physical resource block usage and/or an uplink physical resource block usage. In embodiments involving the filtering at block 416 of FIG. 5, the at least one data point can be at least one data point that remains in the second plurality of data points 504 following the filtering. Thus, in some embodiments, at block 416 of FIG. 5, the output from the steps illustrated at blocks 414 and 416 can be combined in order to estimate the power saved in the first network. In particular, in these embodiments, the power saved in the first network can be estimated as the difference between the relationship 502 that is identified at block 416 of FIG. 5 and at least one data point that remains in the second plurality of data points 504 (i.e. where the power saving feature is activated in the first network) following block 414 of FIG. 5.

The at least one data point can be obtained from the data acquired at block 402 of FIG. 5. In some embodiments, the at least one data point can be obtained from the acquired data following cleaning at block 406 of FIG. 5. For example, the at least one data point can be obtained from acquired data having a quality measure that is greater than a threshold value. In some embodiments, the at least one data point can be each data point (or all data points) of the second plurality of data points 504. That is, according to some embodiments, the estimation of the power saved in the first network can be made for each data point (or all data points) of the second plurality of data points 504, i.e. each data point (or all data points) indicative of the power consumption in the first network for a physical resource block usage value when the power saving feature is activated in the first network.

Steps 420-424 of FIG. 5 can be performed for all network sites or nodes of the first network according to some embodiments. As illustrated at block 420 of FIG. 5, in some embodiments, information identifying one or more properties of the first network may be acquired. For example, the information may be acquired for all network nodes of the first network and/or for all network sites of the first network according to some embodiments. The one or more properties of the first network can be those that are relevant to power consumption in the first network. For example, the one or more properties of the first network may comprise configured transmitted power for the first network, number of cells in the first network, number of transmit (TX) and/or receive (RX) antennas in the first network, and/or any other properties of the first network.

As illustrated at block 422 of FIG. 5, in some embodiments, the information identifying one or more properties of the first network may be pre-processed. For example, the information may be pre-processed by executing standard machine learning pre-processing, such as one-hot encoding for categorical variables and/or feature scaling for numerical variables.

As illustrated at block 424 of FIG. 5, in some embodiments, a third machine learnt model can be trained to predict a power saved in a second network when the power saving feature is activated in the second network. In these embodiments, an input to the training of the third machine learning model may comprise the one or more properties of the first network, and an output of the third machine learnt model used for the training can comprise the estimated power saved. In some embodiments, the method may comprise training a plurality of third machine learnt models, where each of the plurality of third machine learnt models are trained to predict a power saved in the second network when a different power saving feature is activated in the second network. In these embodiments, an input to the training of each third machine learning model may comprise the one or more properties of the first network, and an output of each third machine learnt model used for the training can comprise the estimated power saved when the respective power saving feature is activated. In other embodiments, a single third machine learnt model can be trained to predict a power saved in a second network when a plurality of different power saving feature are activated in the second network. In these embodiments, an input to the training of the third machine learning model may comprise information identifying the different power saving features and the one or more properties of the first network, and an output of the third machine learnt model used for the training can comprise the estimated power saved when the different power saving features are activated in the second network.

A third machine learnt model may be trained using any suitable training algorithm. An example of a suitable training algorithm is a random forest training algorithm. However, it will be understood that any other suitable training algorithm can also be used. In a random forest training algorithm, the hyperparameters of a third machine learnt model may comprises number of trees, depth of the tree, and/or any other hyperparameters. The hyperparameters may be tuned by K-fold cross validation according to some embodiments. In such embodiments, K may be set to 5 and/or the samples of data may be split based on different sites of the second network.

Herein, the second network can be a different network to the first network. The second network referred to herein can be a 5G network, or any other generation network. The second network referred to herein can be a RAN or any other type of network. The second network referred to herein can comprise one or more network nodes, such as one or more base stations. In a RAN embodiment, the first network referred to herein may comprises one or more eNodeBs and/or any other RAN nodes. In some of these embodiments, the method described herein in respect of the second network may be performed in respect of each network node of the second network. In some embodiments, the second network referred to herein can be a virtualized network (e.g. comprising at least some virtual network nodes), or an at least partially virtualized network (e.g. comprising at least some virtual network nodes and at least some hardware network nodes). In some embodiments, the second network referred to herein may comprise a plurality of network sites. In some of these embodiments, the method described herein in respect of the second network may be performed in respect of each network site of the second network. The second network can be a network in which the power saving feature is not currently deployed.

As illustrated at block 426 of FIG. 5, the result of the training at block 424 of FIG. 5 is the third machine learnt model that is trained to predict the power saved in a second network or, in the case of training a plurality of third machine learnt models, the plurality of third machine learnt models that are trained to predict the power saved in the second network. The method ends at block 428 of FIG. 5.

Figure 6:
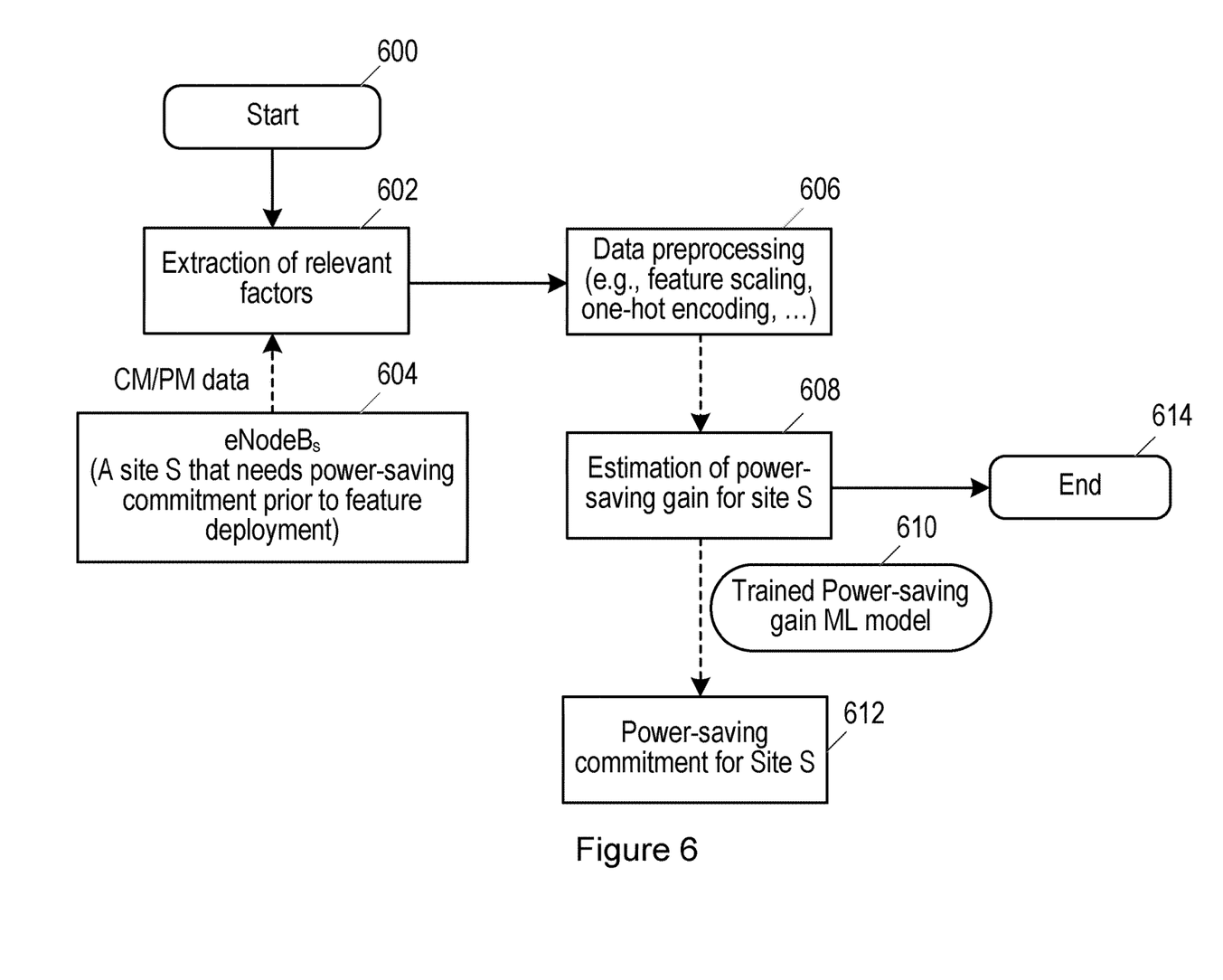
FIG. 6 is a flowchart illustrating a method performed by a system according to an embodiment.

FIG. 6 is a flowchart illustrating another method performed by a system (e.g. at least one entity 10 of the system) in accordance with an embodiment. The entity 10 described earlier with reference to FIG. 1 can be configured to operate in accordance with the method of FIG. 6. The method can be performed by or under the control of the processing circuitry 12 of the entity 10 according to some embodiments. FIG. 6 relates to a method for applying one or more trained third machine learnt models to a second network (or a network node or site of the second network). The second network (or network node or site thereof) can be one that needs power saving gain commitment but that has not deployed the power saving feature. The method starts at block 600 of FIG. 6.

As illustrated at blocks 602 and 604 of FIG. 6 (in a similar manner to block 420 of FIG. 5), in some embodiments, information identifying one or more properties of the second network may be acquired. For example, the information may be acquired for all network nodes of the second network and/or for all network sites of the second network according to some embodiments. The one or more properties of the second network can be those that are relevant to power consumption in the second network. For example, the one or more properties of the second network may comprise configured transmitted power for the second network, number of cells in the second network, number of transmit (TX) and/or receive (RX) antennas in the second network, and/or any other properties of the second network.

As illustrated at block 606 of FIG. 6 (in a similar manner to block 422 of FIG. 5), in some embodiments, the information identifying one or more properties of the second network may be pre-processed. For example, the information may be pre-processed by executing standard machine learning pre-processing, such as one-hot encoding for categorical variables and/or feature scaling for numerical variables.

As illustrated at block 608 of FIG. 6, in some embodiments, the trained third machine learnt model (which is illustrated at block 610 of FIG. 6) is used to output a prediction of the power saved in the second network (or a network node or site thereof) when the power saving feature is activated in the second network (or a network node or site thereof), by inputting into the trained third machine learnt model the one or more properties of the second network (or a network node or site thereof). That is, at block 608 of FIG. 6, the trained third machine learnt model can be used to estimate the power that can be saved in the second network (or a network node or site thereof) if the power saving feature is activated in the second network (or a network node or site thereof). As mentioned earlier, in some embodiments, there may be a plurality of third machine learnt models that are each trained to predict a power saved in the second network when a different power saving feature is activated in the second network. Thus, in these embodiments, any one or more of the plurality of third machine learnt models may be used to output a prediction of the power saved in the second network (or a network node or site thereof) when a different power saving feature is activated in the second network (or a network node or site thereof), by inputting into that trained third machine learnt model the one or more properties of the second network (or a network node or site thereof). As also mentioned earlier, in other embodiments, there may be a single third machine learnt model trained to predict a power saved in a second network when a plurality of different power saving feature are activated in the second network. Thus, in these embodiments, the trained third machine learnt model may be used to output a prediction of the power saved in the second network (or a network node or site thereof) when different power saving features are activated in the second network (or a network node or site thereof), by inputting into the trained third machine learnt model information identifying at least one of the different power saving features and the one or more properties of the second network (or a network node or site thereof).

The output of the trained third machine learnt model(s) is illustrated at block 612 of FIG. 6. The method ends at block 614 of FIG. 6.

Figure 7:
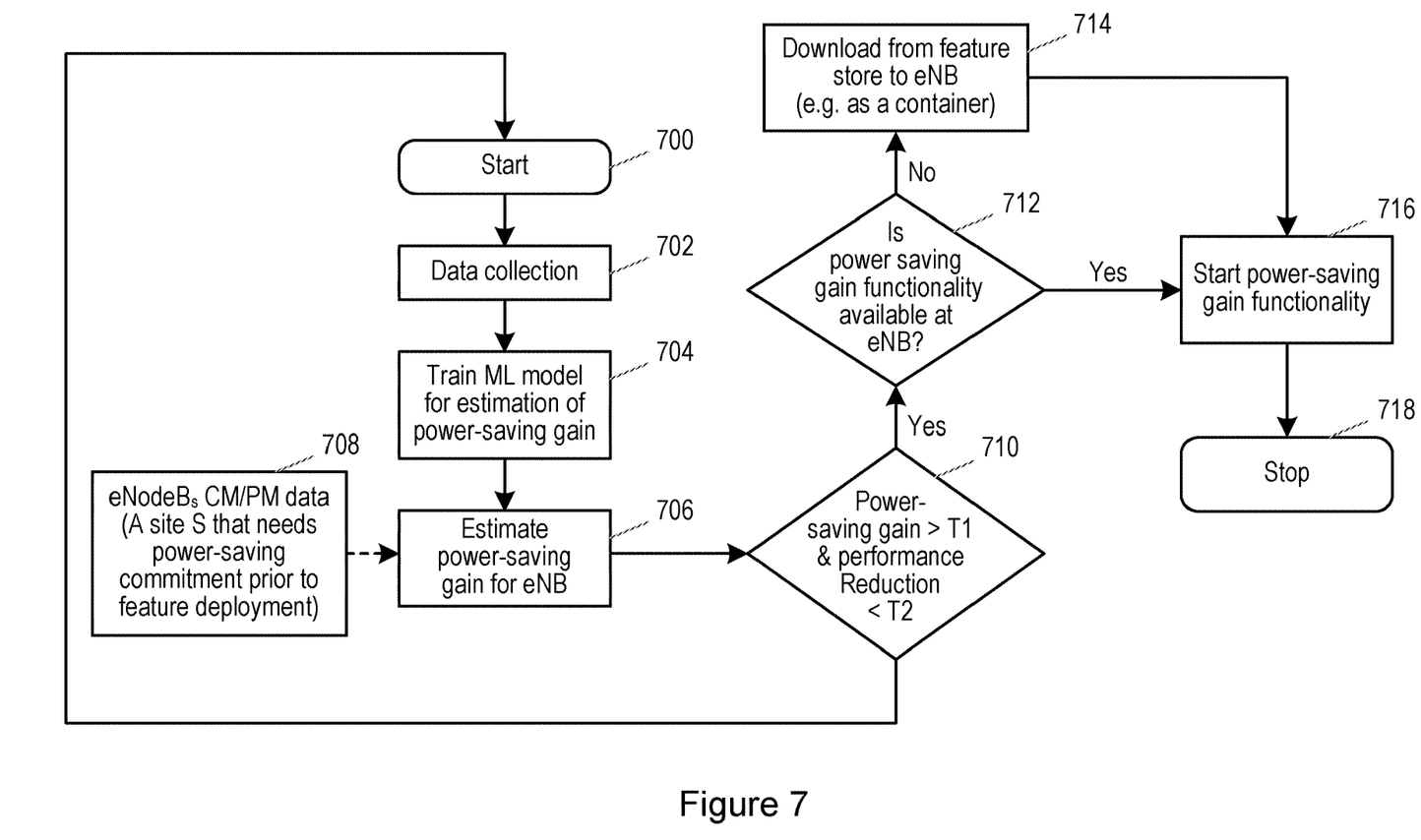
FIG. 7 is a flowchart illustrating a method performed by a system according to an embodiment.

FIG. 7 is a flowchart illustrating a method performed by a system (e.g. at least one entity 10 of the system) in accordance with an embodiment. The entity 10 described earlier with reference to FIG. 1 can be configured to operate in accordance with the method of FIG. 7. The method can be performed by or under the control of the processing circuitry 12 of the entity 10 according to some embodiments. FIG. 7 relates to a method for managing and deciding whether to activate (e.g. install, such as using edge-cloud functionality, and start) a power saving feature in the second network. The method starts at block 700 of FIG. 7.

As illustrated at block 702 of FIG. 7, in some embodiments, data can be acquired for the second network. For example, data can be acquired for one or more network nodes 30, 40, 50 and/or one or more sites of the second network. In some embodiments, the data can be acquired from the second network itself or from at least one memory 306, 404, such as a memory 14 of the entity 10 and/or any other memory (e.g. a centralized memory). For example, at least some of the data may have been previously stored in at least one memory 306, 404. In some embodiments, the data may be acquired during field trials. In some embodiments, an agent can be executed to perform data collection at block 702 of FIG. 7, e.g. for each network node and/or for each site, such as during a field trial. As mentioned earlier, in some embodiments, the data referred to herein can be configuration management (CM) data, performance management (PM) data), or any other type of management data for the second network.

As illustrated at block 704 of FIG. 7 (and as described earlier with reference to block 424 of FIG. 5), in some embodiments, the third machine learnt model can be trained to predict the power saved in the second network (or a network node or site thereof) when the power saving feature is activated in the second network (or a network node or site thereof). In some embodiments (and as also described earlier with reference to block 424 of FIG. 5), a plurality of third machine learnt models may be trained to each predict a power saved in the second network (or a network node or site thereof) when a different power saving feature is activated in the second network (or a network node or site thereof) or a single third machine learnt model may be trained to predict a power saved in the second network (or a network node or site thereof) when different power saving features are activated in the second network (or a network node or site thereof). As mentioned earlier, the second network can be a different network to the first network.

As illustrated at blocks 706 and 708 of FIG. 7 (and as described earlier with reference to block 608 of FIG. 6), in some embodiments, the trained third machine learnt model can be used to output a prediction of the power saved in the second network (or a network node or site thereof) when the power saving feature is activated in the second network (or a network node or site thereof). That is, at block 706 of FIG. 7, the trained third machine learnt model can be used to estimate the power that can be saved in the second network (or a network node or site thereof) if the power saving feature is activated in the second network (or a network node or site thereof). In some embodiments, an estimation of the power that can be saved in the second network may be made for a plurality of different power saving features. For example, in some embodiments (and as also described earlier with reference to block 608 of FIG. 6), any one or more of a plurality of third machine learnt models may be used to output a prediction of the power saved in the second network (or a network node or site thereof) when a different power saving feature is activated in the second network (or a network node or site thereof) or a single third machine learnt model may be used to output a prediction of the power saved in the second network (or a network node or site thereof) when different power saving features are activated in the second network (or a network node or site thereof).

As illustrated at block 710 of FIG. 7, in some embodiments, it may be determined whether the prediction is greater than a minimum threshold (T1) and/or whether a reduction in the performance of the second network is less than a maximum threshold (T2). In this way, it can advantageously be determined whether the power saved in the second network is well balanced with any possible performance reduction in the functionality (or increase in footprint) of the second network. In these embodiments, the method may proceed to block 712 of FIG. 7, or even straight to block 716 of FIG. 7, only if the prediction is greater than the minimum threshold (T1) and/or a reduction in the performance of the second network is less than the maximum threshold (T2). In other embodiments, the method may simply proceed straight to block 712 of FIG. 7, or even straight to block 716 of FIG. 7, from block 706 of FIG. 7. The minimum threshold (T1) and/or the maximum threshold (T2) may be predefined, e.g. defined by an operator.

As illustrated at block 712 of FIG. 7, in some embodiments, it may be determined whether the power saving feature is available at the second network (or a network node or site thereof). The power saving feature may be available at second network if it is installed on at least one network node of the second network. As illustrated at block 714 of FIG. 7, in some embodiments, if it is determined at block 712 of FIG. 7 that the power saving feature is unavailable at the second network, the power saving feature may be acquired. For example, the power saving feature may be downloaded, such as from storage, e.g. from a virtual network function (VNF) store. The power saving feature can then be installed in the second network, e.g. on at least one network node of the second network. The method can then proceed to block 716 of FIG. 7.

As illustrated in FIG. 7, in some embodiments, the step illustrated at block 716 of FIG. 7 may only be performed if it is determined at block 710 of FIG. 7 that the prediction is greater than the minimum threshold and/or a reduction in performance of the second network is less than the maximum threshold. As illustrated at block 716 of FIG. 7, in some embodiments, activation of the power saving feature can be initiated in the second network. In some embodiments, the power saving feature may be activated for the entire second network or for only part of the second network. For example, the power saving feature may be activated for one or more network nodes and/or one or more sites of the second network. In some embodiments where the power saving feature is activated for a network node and/or site of the second network, the power saving feature may be activated for the entire network node and/or site, or for only part of the network node and/or site (e.g. for specific users). The method ends at block 718 of FIG. 7.

Thus, as described earlier, there is provided a method that can enable network providers to commit to power saving gains for power saving feature(s) prior to the deployment of the power saving feature(s). The method can apply machine learning on a large amount of historical data from power saving trials (during which power saving feature(s) are activated and deactivated). The data can be cleaned and pre-processed in some embodiments, e.g. in a sequence of steps, to extract only relevant data points. The data points can then provide a basis for estimating the power saved by having the power saving feature activated. The data points can also be further processed to enable training of a machine learnt model for application to another network or site, which does not have the power saving feature(s), to predict the power that can be saved if the power saving feature(s) were used in order to provide the power saving gain commitment.

Figure 8:
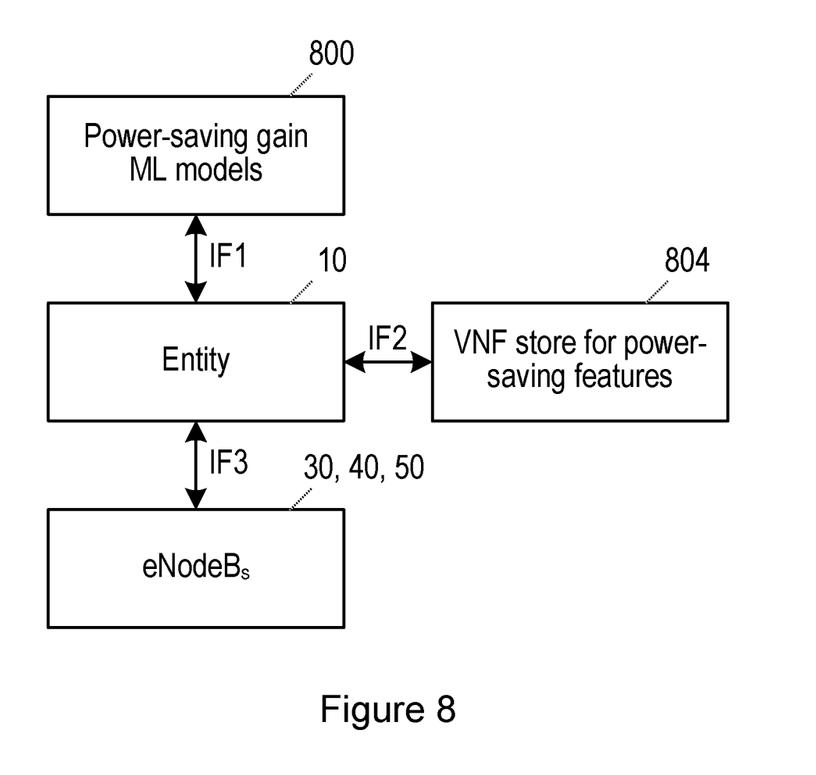
FIG. 8 is a block diagram illustrating a system according to an embodiment.

FIG. 8 illustrates a system according to an embodiment. As illustrated in FIG. 8, the system comprises at least one entity 10 as described earlier. The entity 10 can be operable to perform any one or more of the method steps described earlier. In some embodiments, the system can also comprise one or more network nodes 30, 40, 50 of the first network (and/or one or more network nodes of the second network), storage 800 for storing any one or more of the machine learnt models mentioned herein, and/or storage 804 for storing one or more power saving features.

As illustrated in FIG. 8, the at least one entity 10 can communicate with the storage 800 for storing any one or more of the machine learnt models via a first interface (IF1), the storage 804 for storing one or more power saving features via a second interface (IF2), and/or the one or more network nodes 30, 40, 50 of the first network (and/or the one or more network nodes of the second network) via a third interface (IF3). In some embodiments, the entity 10 may request one or more of the machine learnt models from storage 800, e.g. via IF1, for use in the method described herein. Similarly, the entity 10 may request one or more of the power saving features from storage 804, e.g. via IF2, for use in the method described herein. In some embodiments, the entity 10 may exchange data with, and/or transfer and optionally also install VNFs on, one or more network nodes 30, 40, 50 of the first network (and/or one or more network nodes of the second network), e.g. via IF3.

Figure 9:
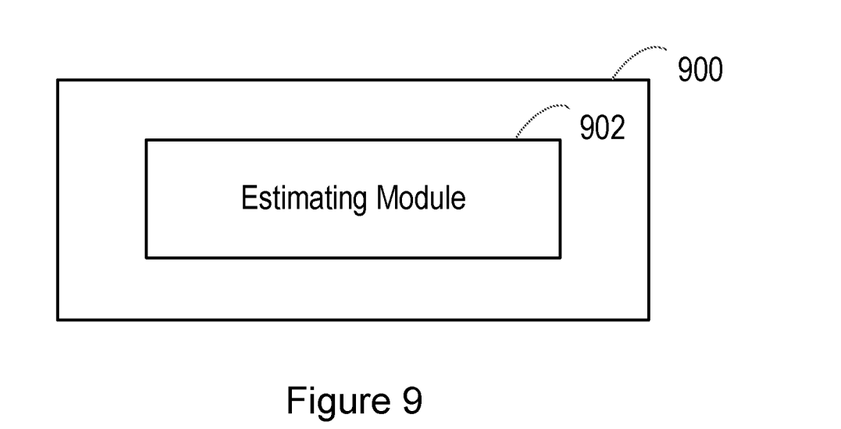
FIG. 9 is a block diagram illustrating an entity according to an embodiment.

FIG. 9 is a block diagram illustrating an entity 900 in accordance with an embodiment. The entity 900 comprises an estimating module 902 configured to estimate the power saved in a first network as a difference between: a relationship between power consumption in the first network as a function of physical resource block usage in the first network when a power saving feature is deactivated in the first network, and at least one data point indicative of the power consumption in the first network for a physical resource block usage value when the power saving feature is activated in the first network. The entity 900 may operate in the manner described herein.

There is also provided a computer program comprising instructions which, when executed by processing circuitry (such as the processing circuitry 12 of the entity 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the entity 10 described earlier) to cause the processing circuitry to perform at least part of the method described herein. There is provided a computer program product comprising a carrier containing instructions for causing processing circuitry (such as the processing circuitry 12 of the entity 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the entity 10 functionality described herein can be performed by hardware. Thus, in some embodiments, the entity 10 described herein can be a hardware entity. However, it will also be understood that optionally at least part or all of the entity 10 functionality described herein can be virtualized. For example, the functions performed by the entity 10 described herein can be implemented in software running on generic hardware that is configured to orchestrate the entity functionality. Thus, in some embodiments, the entity 10 described herein can be a virtual entity. In some embodiments, at least part or all of the entity 10 functionality described herein may be performed in a network enabled cloud. Thus, the method described herein can be realised as a cloud implementation according to some embodiments. The entity 10 functionality described herein may all be at the same location or at least some of the entity functionality may be distributed, e.g. the entity 10 functionality described herein may be performed by one or more different entities.

It will be understood that at least some or all of the method steps described herein can be automated in some embodiments. That is, in some embodiments, at least some or all of the method steps described herein can be performed automatically.

Thus, in the manner described herein, there is advantageously provided a technique for estimating power saved in a network.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for estimating power saved in a first network, the method being performed by a system, the method comprising:
   estimating the power saved in the first network as a difference between:
     a relationship between power consumption in the first network as a function of physical resource block usage in the first network when a power saving feature is deactivated in the first network; and
     at least one data point indicative of the power consumption in the first network for a physical resource block usage value when the power saving feature is activated in the first network; and
   filtering, from a first plurality of data points, data points that are detected to be an anomaly, each data point of the first plurality of data points indicative of the power consumption in the first network for a physical resource block usage value when the power saving feature is activated in the first network, and the at least one data point being at least one data point that remains in a second plurality of data points following the filtering.

2. The method as claimed in claim 1, the method comprising:
   applying a first machine learnt model, trained to identify relationships, to a third plurality of data points to identify the relationship, wherein each data point of the third plurality of data points is indicative of the power consumption in the first network for a physical resource block usage value when the power saving feature is deactivated in the first network.

3. The method as claimed in claim 2, wherein:
   the first machine learnt model is trained to identify relationships using a regression algorithm.

4. The method as claimed in claim 1, the method comprising:
   detecting data points that are an anomaly.

5. The method as claimed in claim 1, wherein:
   data points are detected to be an anomaly using a second machine learnt model trained to detect anomalies.

6. The method as claimed in claim 5, wherein:
   the second machine learnt model is trained to detect anomalies using a local outlier factor, LOF, algorithm.

7. The method as claimed in claim 5, wherein:
   the second machine learnt model is trained to detect anomalies based on one or both of:
   at least one measure of traffic in the first network; and
   at least one key performance indicator, KPI, for the first network.

8. The method as claimed in claim 7, wherein:
   a data point is detected to be an anomaly if one or both of:
     at least one measure of traffic in the first network at a time associated with the data point differs by more than a threshold amount from at least one corresponding measure of traffic in the first network at a time associated with at least one other data point in the first plurality of data points; and
   at least one KPI for the first network at the time associated with the data point differs by more than a threshold amount from at least one corresponding KPI for the first network at the time associated with at least one other data point in the first plurality of data points.

9. The method as claimed in claim 1, wherein:
   the filtering is performed for each network node of the first network.

10. The method as claimed in claim 1, the method comprising:
    separating acquired data into a third plurality of data points and a second fourth plurality of data points, wherein each data point of the third plurality of data points is indicative of the power consumption in the first network for a physical resource block usage value when the power saving feature is deactivated in the first network, and wherein each data point of the fourth plurality of data points is indicative of the power consumption in the first network for a physical resource block usage value when the power saving feature is activated in the first network.

11. The method as claimed in claim 10, wherein:
    the separating is performed for each network node of the first network.

12. The method as claimed in claim 1, wherein:
    the at least one data point is obtained from acquired data having a quality measure that is equal to or greater than a threshold value.

13. The method as claimed in claim 1, wherein:
    the method is performed for each data point indicative of the power consumption in the first network for a physical resource block usage value when the power saving feature is activated in the first network.

14. The method as claimed in claim 1, wherein:
    the physical resource block usage is one or both of a downlink physical resource block usage and an uplink physical resource block usage.

15. The method as claimed in claim 1, wherein:
    the first network comprises a plurality of network sites; and the method is performed for each network site of the plurality of network sites.

16. The method as claimed in claim 1, wherein:
the first network is a radio access network, RAN.

17. The method as claimed in claim 1, wherein:
the first network is a virtualized network.

18. The method as claimed in claim 1, the method comprising:
training a third machine learnt model to predict a power saved in a second network when the power saving feature is activated, wherein an input to training of the third machine learning model comprises one or more properties of the first network, and wherein an output of the third machine learnt model used for the training comprises the estimated power saved.

19. The method as claimed in claim 18, the method comprising:
using the trained third machine learnt model to output a prediction of the power saved in the second network when the power saving feature is activated, by inputting into the trained third machine learnt model one or more properties of the second network.

20. The method as claimed in claim 19, the method comprising:
initiating activation of the power saving feature in the second network if the prediction is greater than a minimum threshold.

21. The method as claimed in claim 20, the method comprising:
determining whether the prediction is greater than the minimum threshold.

22. The method as claimed in claim 20, the method comprising:
initiating the activation of the power saving feature in the second network if a reduction in performance of the second network is less than a maximum threshold.

23. The method as claimed in claim 22, the method comprising:
determining whether the reduction in the performance of the second network is less than the maximum threshold.

24. The method as claimed in claim 18, wherein:
the second network comprises a plurality of network sites; and
the method is performed in respect of each network site.

25. The method as claimed in claim 18, wherein:
the second network is a radio access network, RAN.

26. The method as claimed in claim 18, wherein:
the second network is a virtualized network.

27. A system for estimating power saved in a network, the system comprising:
at least one entity, each of the at least one entity having processing circuitry configured to cause the at least one entity to:
estimate power saved in a network as a difference between:
a relationship between power consumption in the network as a function of physical resource block usage in the network when a power saving feature is deactivated in the network; and
at least one data point indicative of the power consumption in the network for a physical resource block usage value when the power saving feature is activated in the network; and
filter, from a first plurality of data points, data points that are detected to be an anomaly, each data point of the first plurality of data points indicative of the power consumption in the first network for a physical resource block usage value when the power saving feature is activated in the first network, and the at least one data point being at least one data point that remains in a second plurality of data points following the filtering.

28. A non-transitory machine-readable storage medium storing instructions which are executable by processing circuitry to cause the processing circuitry to perform a method, the method comprising:
estimating power saved in a network as a difference between:
a relationship between power consumption in the network as a function of physical resource block usage in first network when a power saving feature is deactivated in the network; and
at least one data point indicative of the power consumption in the network for a physical resource block usage value when the power saving feature is activated in the network; and
filtering, from a first plurality of data points, data points that are detected to be an anomaly, each data point of the first plurality of data points indicative of the power consumption in the first network for a physical resource block usage value when the power saving feature is activated in the first network, and the at least one data point being at least one data point that remains in a second plurality of data points following the filtering.

* * * * *